US012669458B2

(12) United States Patent
Son et al.

(10) Patent No.: US 12,669,458 B2
(45) Date of Patent: Jun. 30, 2026

(54) WELDING INSPECTION APPARATUS FOR BATTERY MODULES

(71) Applicant: LG ENERGY SOLUTION, LTD., Seoul (KR)

(72) Inventors: Dae Hee Son, Daejeon (KR); Chang Hui Lee, Daejeon (KR); Jin Woo Ku, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 166 days.

(21) Appl. No.: 18/281,258

(22) PCT Filed: Aug. 26, 2022

(86) PCT No.: PCT/KR2022/012842
§ 371 (c)(1),
(2) Date: Sep. 8, 2023

(87) PCT Pub. No.: WO2023/033467
PCT Pub. Date: Mar. 9, 2023

(65) Prior Publication Data
US 2024/0142398 A1 May 2, 2024

(30) Foreign Application Priority Data
Sep. 3, 2021 (KR) ........................ 10-2021-0117368

(51) Int. Cl.
*G01N 27/20* (2006.01)
*G01N 27/04* (2006.01)
(Continued)

(52) U.S. Cl.
CPC .......... *G01N 27/20* (2013.01); *G01N 27/045* (2013.01); *H01M 10/4285* (2013.01); *H01M 50/516* (2021.01)

(58) Field of Classification Search
CPC .... G01N 27/20; G01N 27/045; G01N 33/207; H01M 10/4285; H01M 50/516;
(Continued)

(56) References Cited

U.S. PATENT DOCUMENTS 10,274,448 B2    4/2019   Lupienski et al.
2001/0028238 A1   10/2001   Nakamura et al.
(Continued)

FOREIGN PATENT DOCUMENTS

CN    109217399 A  *  1/2019  ............ H02J 7/0016
JP    2003282150 A  *  10/2003
(Continued)

OTHER PUBLICATIONS

International Search Report for PCT/KR2022/012842 (PCT/ISA/210) mailed on Nov. 23, 2022.
(Continued)

*Primary Examiner* — Feba Pothen
(74) *Attorney, Agent, or Firm* — Birch, Stewart, Kolasch & Birch, LLP

(57) ABSTRACT

Discussed is a welding inspection apparatus for battery modules capable of applying an alternating current to a bank constituted by two or more battery cells connected in parallel and a battery module constituted by one or more banks connected in series to calculate an impedance and a resistance value of each of the one or more banks, and a method of inspecting welding of the battery module using the welding inspection apparatus.

13 Claims, 9 Drawing Sheets

(51) Int. Cl.
  *H01M 10/42*          (2006.01)
  *H01M 50/516*        (2021.01)

(58) Field of Classification Search
  CPC . H01M 10/42; G01R 31/3865; G01R 31/389;
       G01R 31/396; Y02E 60/10
  See application file for complete search history.

(56)                References Cited

U.S. PATENT DOCUMENTS

| | | | |
|---|---|---|---|
| 2003/0062875 | A1 | 4/2003 | Nakamura et al. |
| 2005/0206389 | A1 | 9/2005 | Nakamura et al. |
| 2005/0206390 | A1 | 9/2005 | Nakamura et al. |
| 2005/0208368 | A1 | 9/2005 | Nakamura et al. |
| 2005/0214633 | A1 | 9/2005 | Nakamura et al. |
| 2008/0303528 | A1* | 12/2008 | Kim ..................... G01R 31/385 |
| | | | 324/430 |
| 2009/0228163 | A1* | 9/2009 | Tarchinski ............ B60L 3/0053 |
| | | | 903/907 |
| 2012/0286945 | A1* | 11/2012 | Lev ......................... G01R 31/66 |
| | | | 702/38 |
| 2014/0162157 | A1 | 6/2014 | Jeong et al. |
| 2014/0315047 | A1 | 10/2014 | Cattin et al. |
| 2017/0201103 | A1* | 7/2017 | Jeon ..................... H02J 7/0014 |

| | | | |
|---|---|---|---|
| 2020/0278398 | A1 | 9/2020 | Isa et al. |
| 2021/0132154 | A1 | 5/2021 | Kasper et al. |
| 2022/0357294 | A1 | 11/2022 | Joung et al. |
| 2024/0133967 | A1* | 4/2024 | Kitagawa .......... G01R 31/3828 |

FOREIGN PATENT DOCUMENTS

| | | | |
|---|---|---|---|
| JP | 3598873 | B2 | 12/2004 |
| JP | 2007-333494 | A | 12/2007 |
| JP | 2012-163510 | A | 8/2012 |
| JP | 2018-41581 | A | 3/2018 |
| JP | 2021-70061 | A | 5/2021 |
| KR | 10-1416399 | B1 | 7/2014 |
| KR | 10-1572650 | B1 | 12/2015 |
| KR | 10-2016-0058281 | A | 5/2016 |
| KR | 101877304 | B1 * | 7/2018 |
| KR | 10-2020-0058399 | A | 5/2020 |
| KR | 10-2156866 | B1 | 9/2020 |
| KR | 10-2021-0065297 | A | 6/2021 |

OTHER PUBLICATIONS

Extended European Search Report for European Application No. 22864969.5, dated Jul. 23, 2024.

* cited by examiner

【FIG. 1】
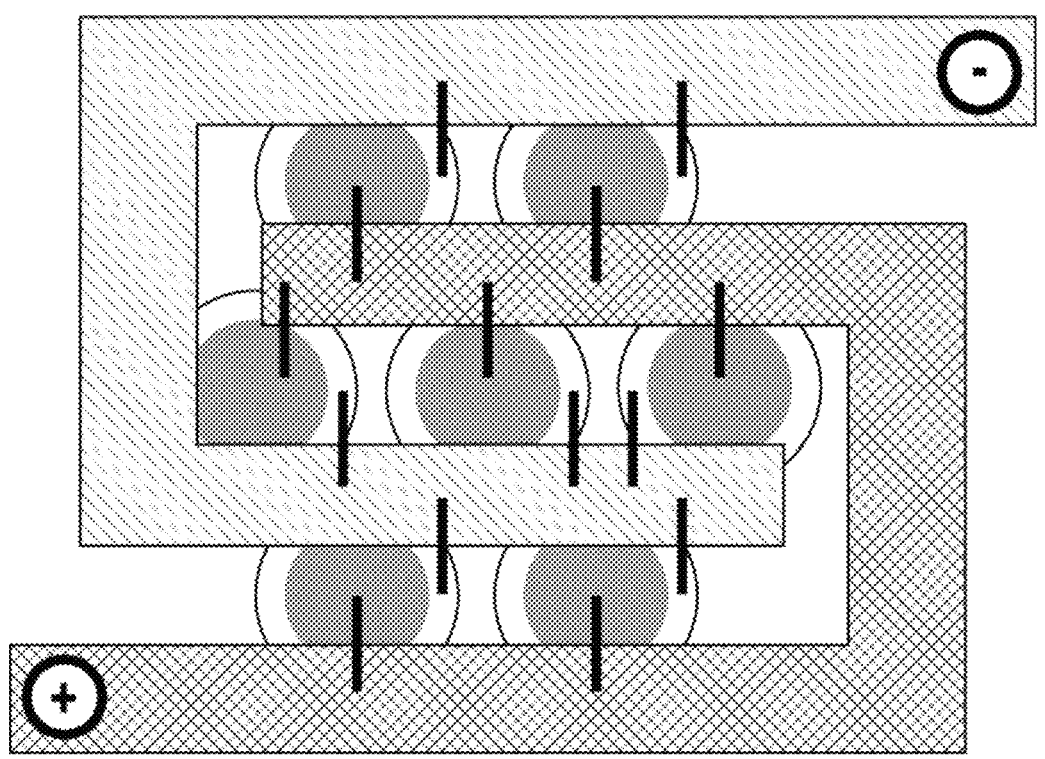
【FIG. 2】
100
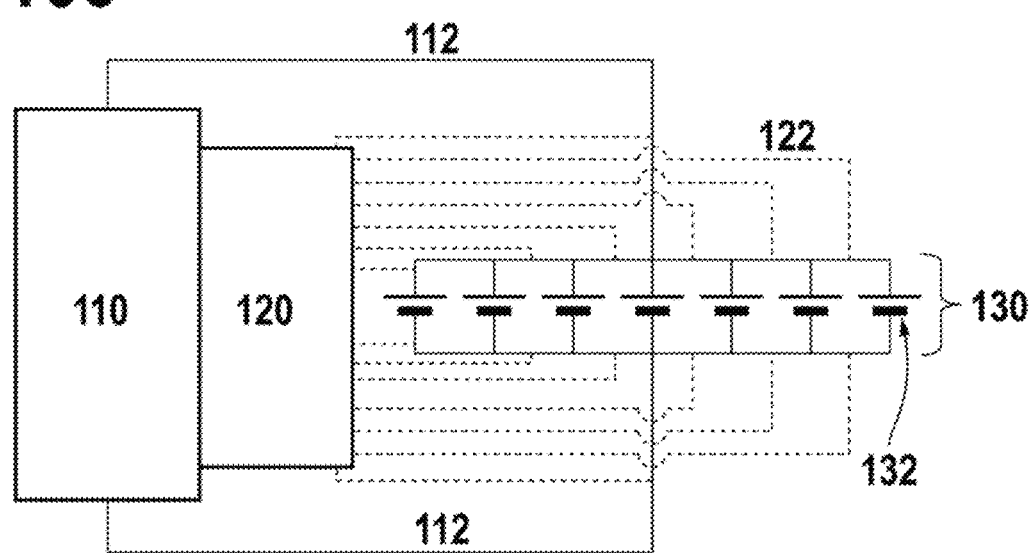

【FIG. 3】
200
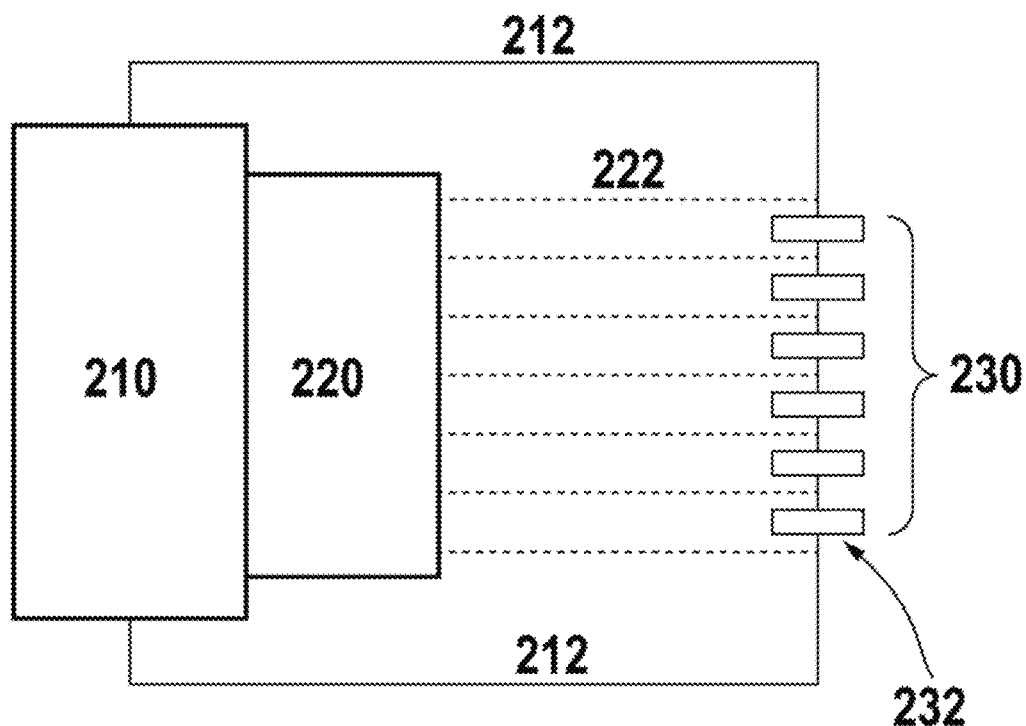
【FIG. 4】
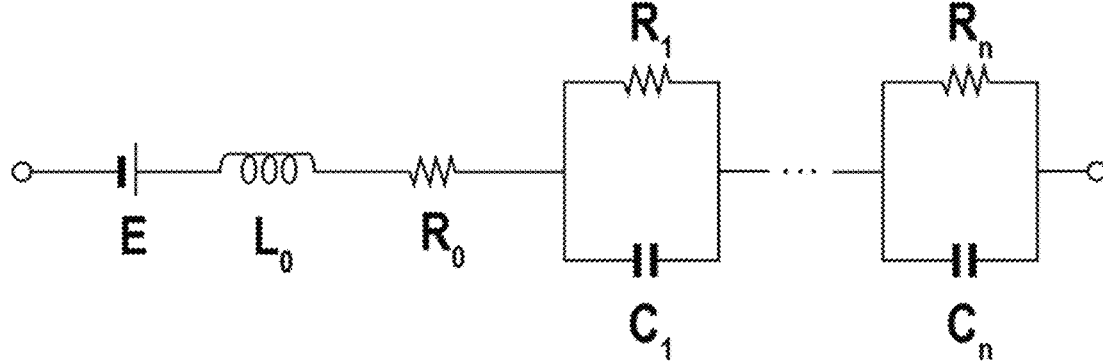

【FIG. 5】
300
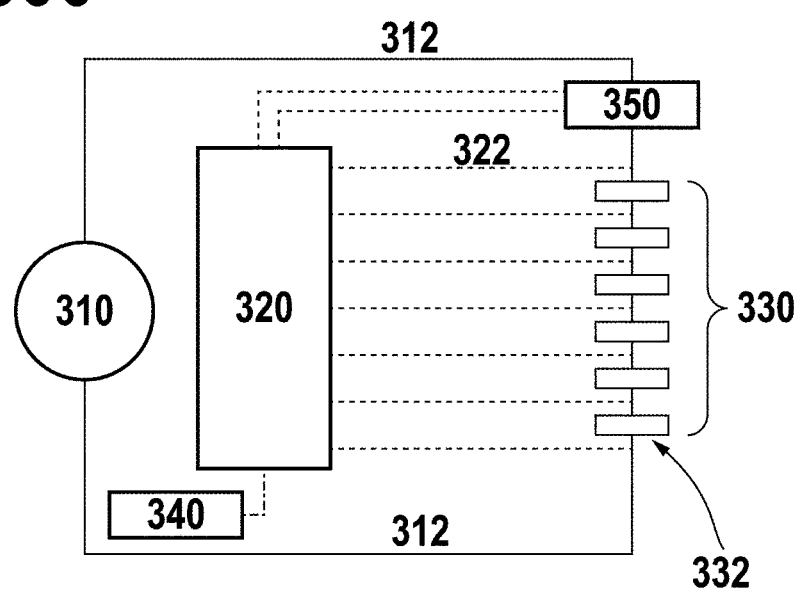
【FIG. 6】
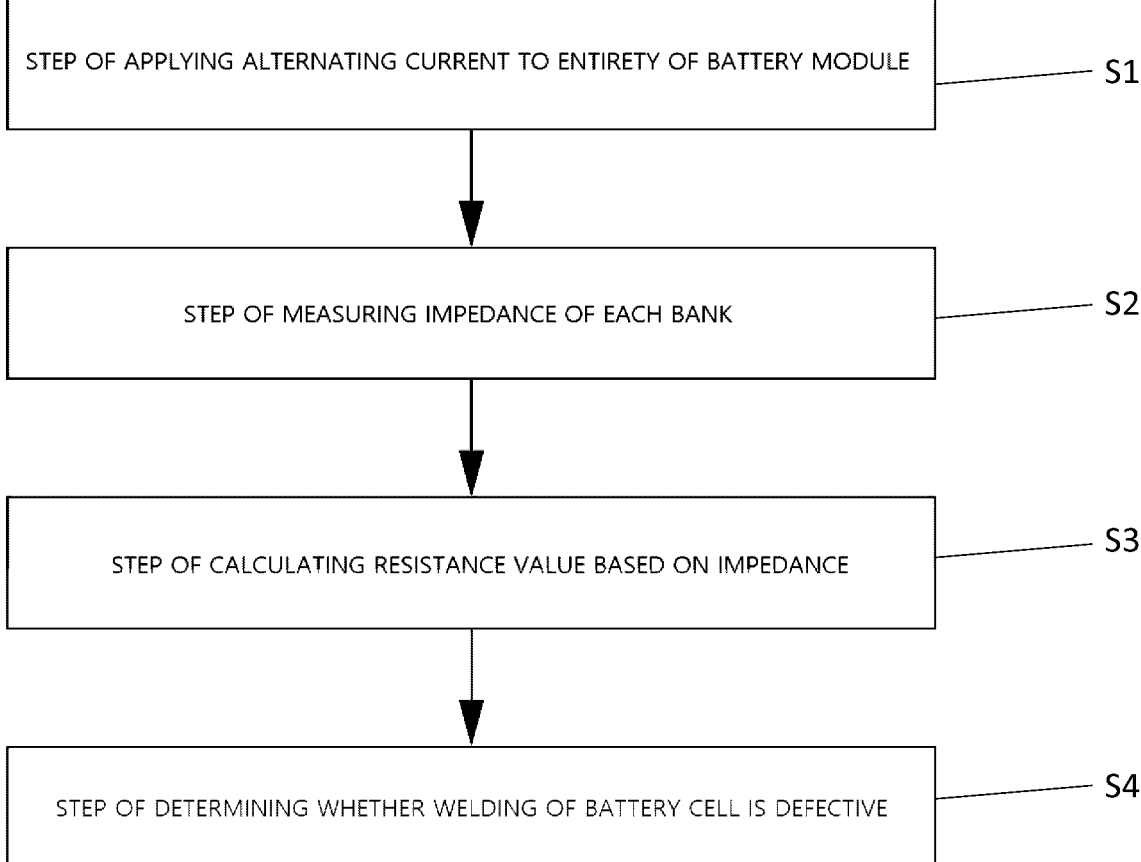
STEP OF APPLYING ALTERNATING CURRENT TO ENTIRETY OF BATTERY MODULE — S1
STEP OF MEASURING IMPEDANCE OF EACH BANK — S2
STEP OF CALCULATING RESISTANCE VALUE BASED ON IMPEDANCE — S3
STEP OF DETERMINING WHETHER WELDING OF BATTERY CELL IS DEFECTIVE — S4

【FIG. 7】
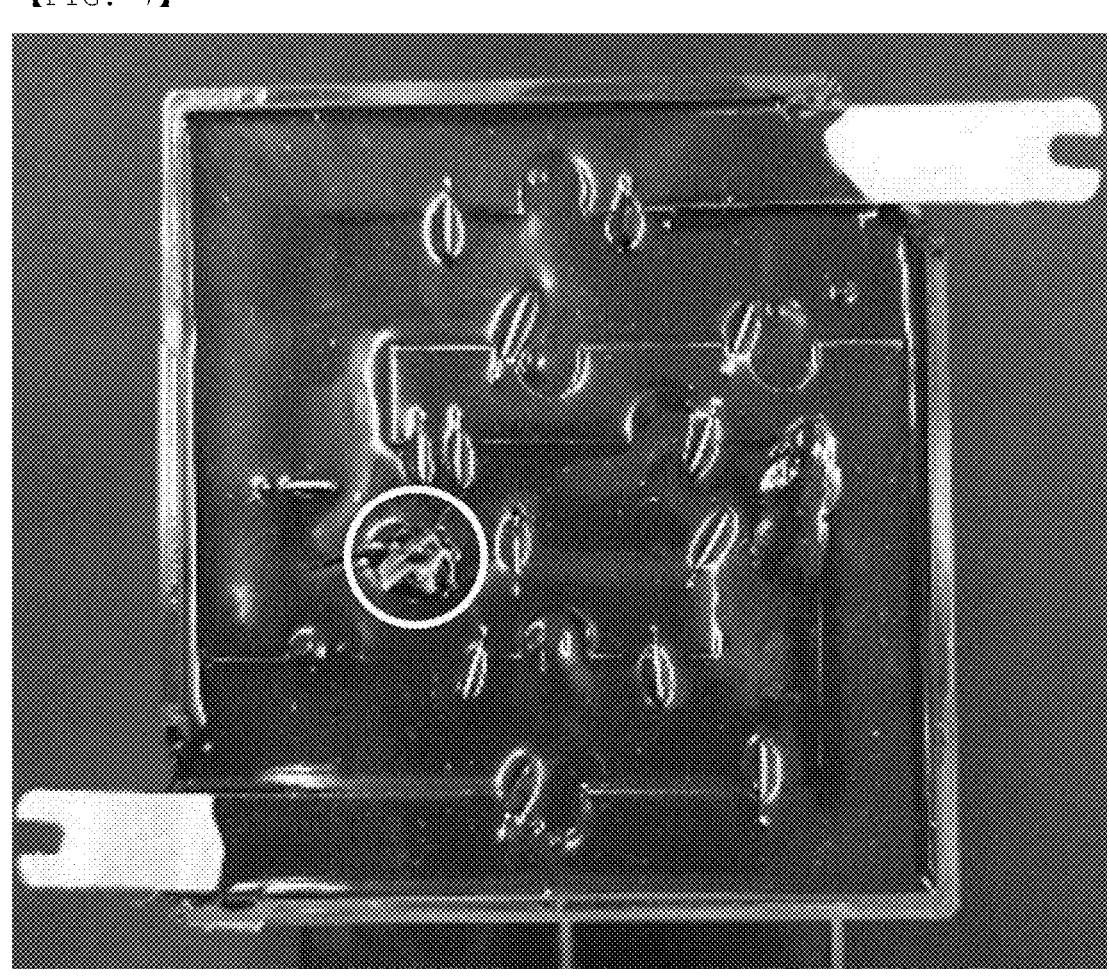

[FIG. 8]
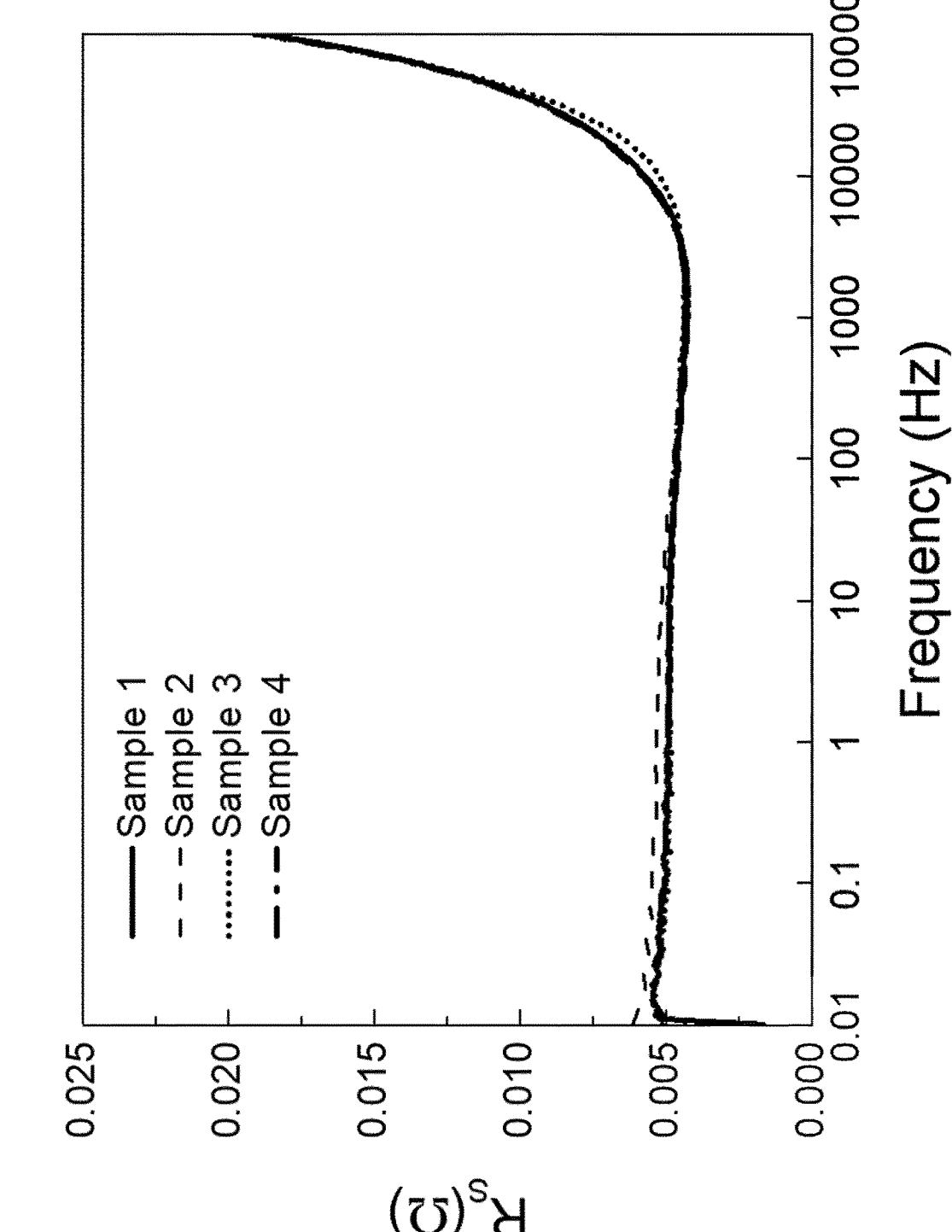

[FIG. 9]
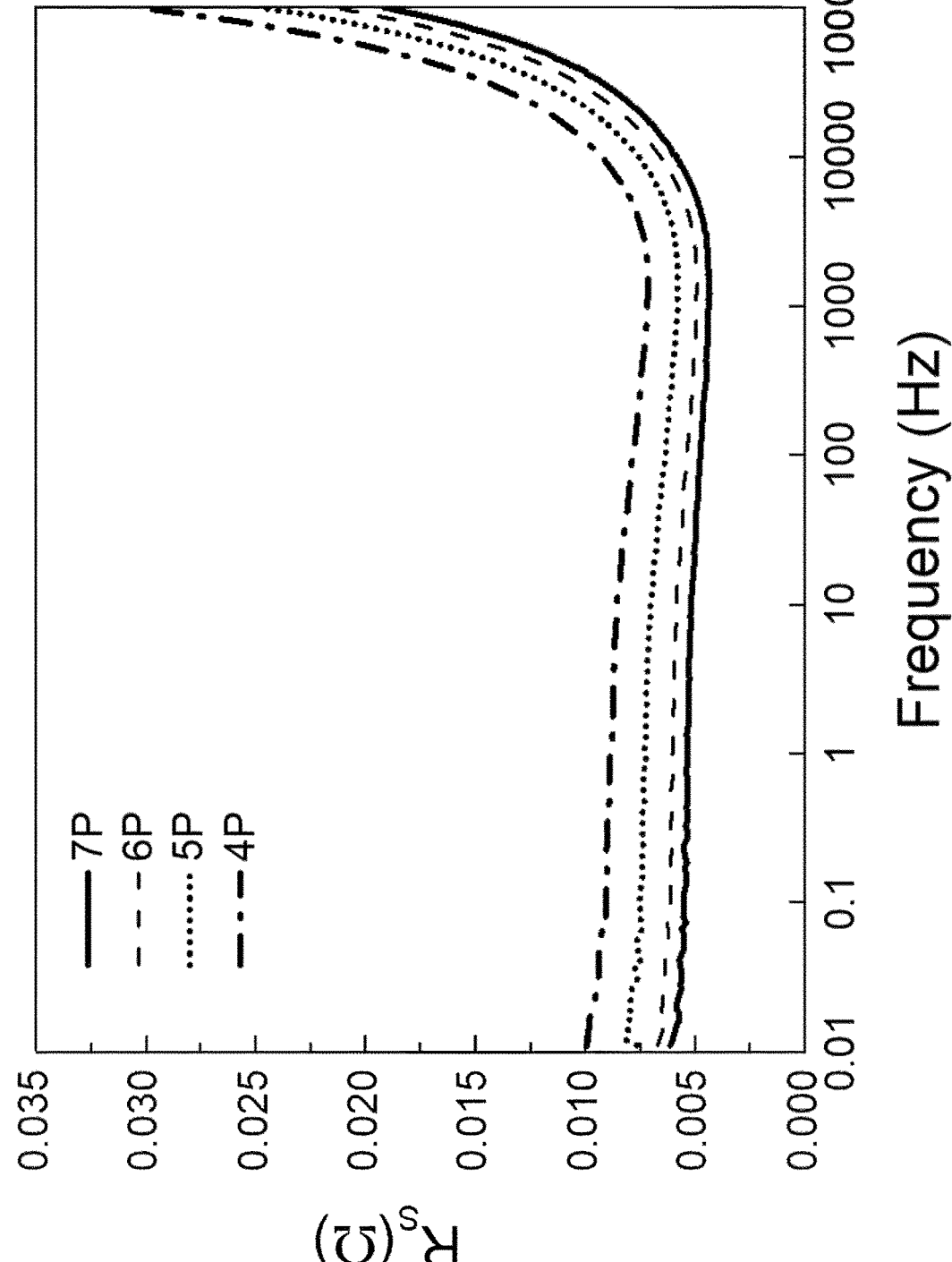

[FIG. 10]
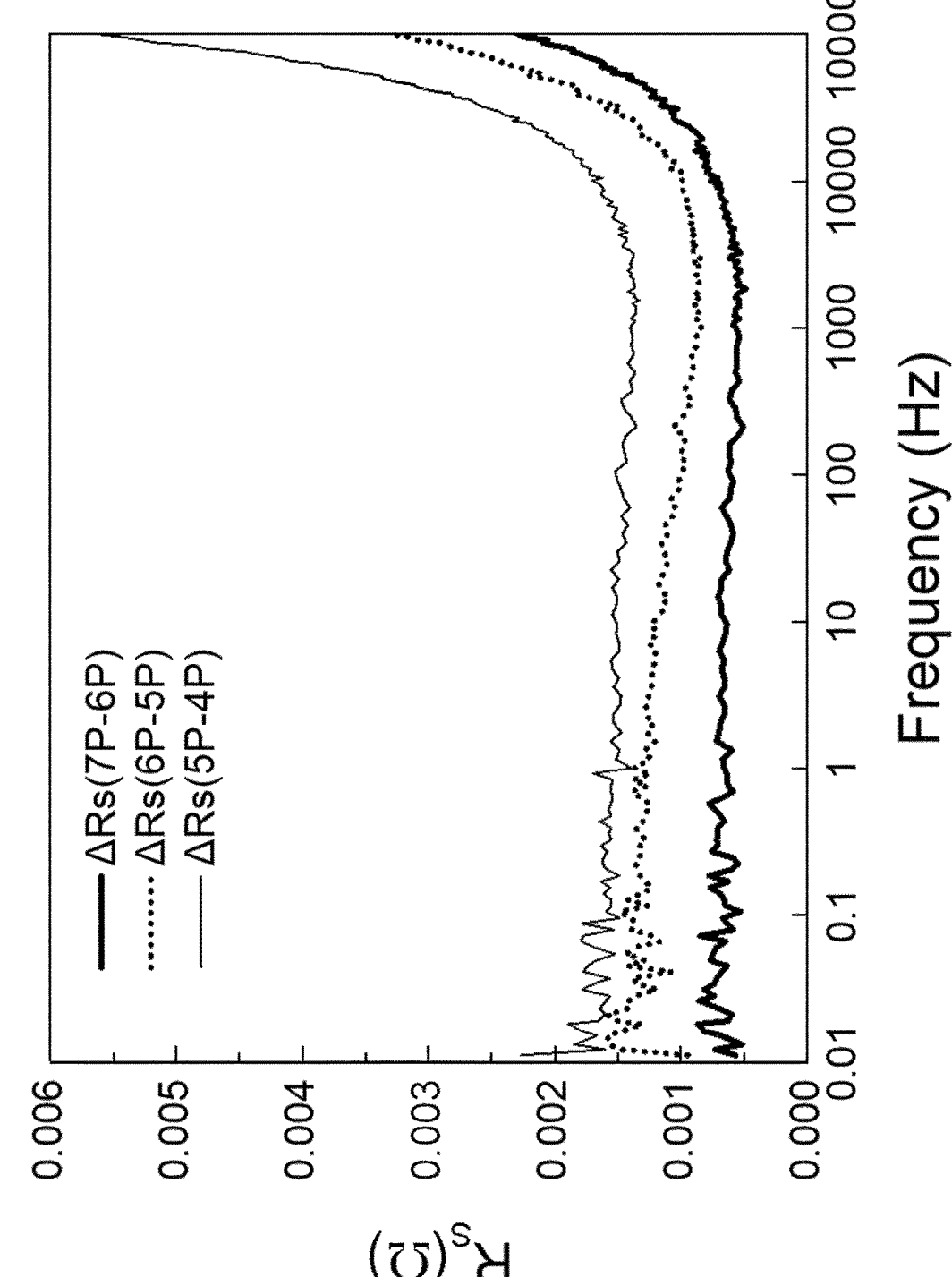

[FIG. 11]

[FIG. 12]
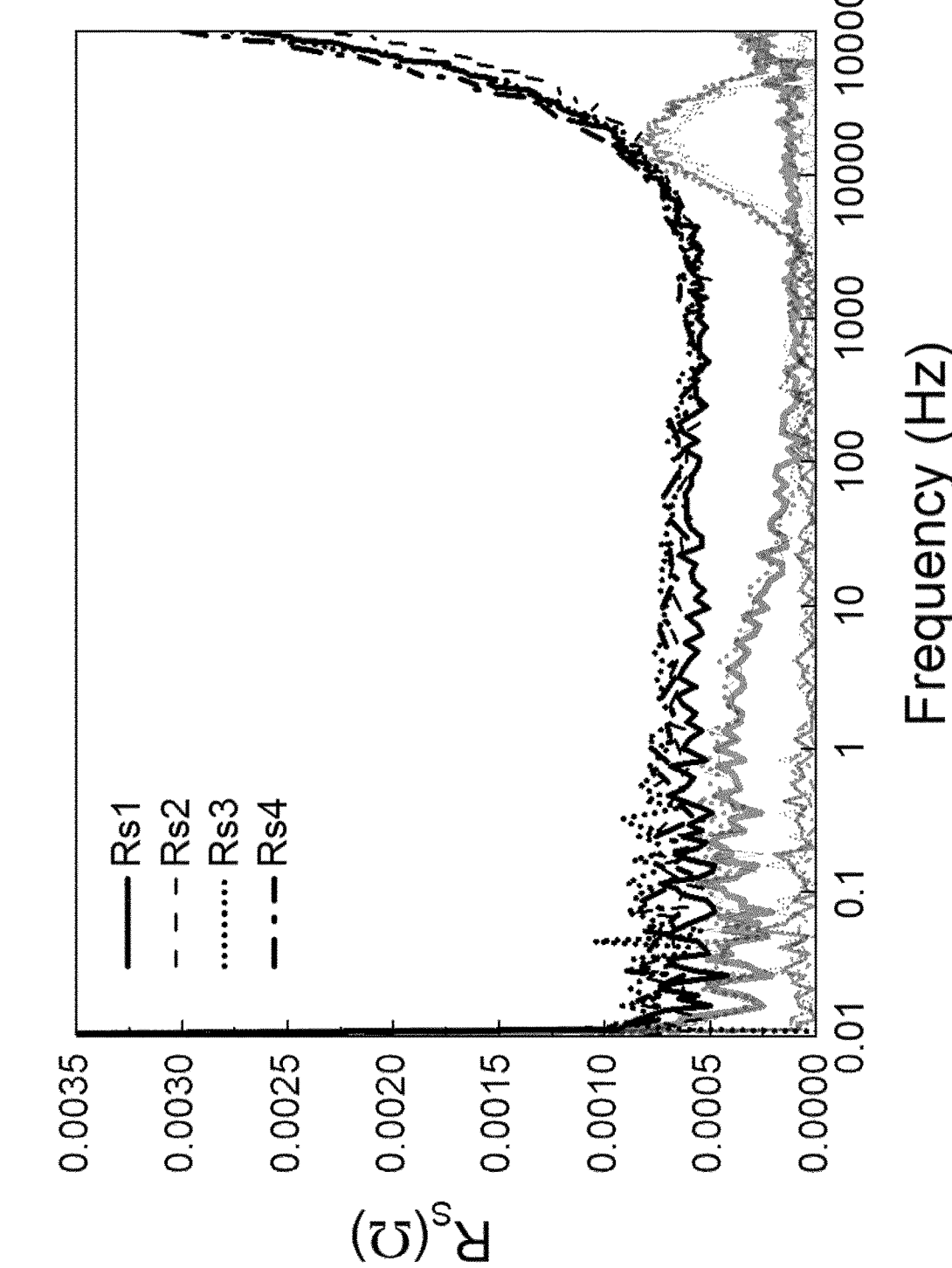

WELDING INSPECTION APPARATUS FOR BATTERY MODULES

CROSS REFERENCE TO RELATED APPLICATION

This application claims the benefit of priority to Korean Patent Application No. 2021-0117368 filed on Sep. 3, 2021, the disclosure of which is incorporated herein by reference in its entirety.

TECHNICAL FIELD

The present invention relates to a welding inspection apparatus for battery modules. More particularly, the present invention relates to a welding inspection apparatus for battery modules capable of applying alternating current to a bank constituted by two or more battery cells connected to each other in parallel and a battery module constituted by one or more banks connected to each other in series to calculate impedance and the resistance value of each of the banks and a method of inspecting welding of the battery module using the same.

BACKGROUND ART

Based on the shape of a battery case, a secondary battery may be classified as a cylindrical battery having an electrode assembly mounted in a cylindrical metal can, a prismatic battery having an electrode assembly mounted in a prismatic metal can, or a pouch-shaped battery having an electrode assembly mounted in a pouch-shaped case made of an aluminum laminate sheet.

Individual battery cells are directly disposed in a small device; however, a battery module constituted by a plurality of battery cells electrically connected to each other or a battery pack constituted by a plurality of battery modules connected to each other is used in a vehicle. A battery module is designed such that a plurality of battery cells is connected to each other in series or in parallel to output a predetermined voltage or higher. In order to electrically connect the plurality of battery cells to each other, a busbar made of a thin metal sheet is generally used, and the busbar and each battery cell are electrically connected to each other by welding.

FIG. 1 is a schematic view of a bank constituted by cylindrical batteries connected to each other in parallel using busbars. FIG. 1 is a view schematically showing the structure in which two laid-down U-shaped negative electrode and positive electrode busbars (indicated respectively by hatch and lattice patterns) are disposed at an upper surface and seven cylindrical batteries are disposed at a lower surface when viewed from above. Each of central grey circles of the cylindrical batteries indicated by seven concentric circles corresponds to a positive electrode, and a doughnut portion therearound corresponds to a negative electrode. All of the positive electrodes of the seven cylindrical batteries are electrically connected to the lattice-patterned busbar, and all of the negative electrodes of the seven cylindrical batteries are electrically connected to the hatch-patterned busbar. This is an embodiment, and this configuration is generally referred to as 7-parallel (7P) connection. Battery cells connected to each other in 7P constitute a bank, and when three banks are connected to each other in series, this is referred to as 3S7P. Here, S means serial. The number of battery cells connected to each other in parallel and the number of banks connected to each other in series may be easily changed depending on characteristics of a relevant product. A bank may be constituted through series connection, and banks may be connected to each other in parallel. A description was given based on the cylindrical batteries with reference to FIG. 1; however, this construction may also be equally applied to prismatic batteries or pouch-shaped batteries.

In general, internal components of one bank are connected to each other in parallel. When internal components of one bank are connected to each other in series, electricity does not properly flow in the bank even if only one of electrical connections in the bank is abnormal. In this case, however, a welding defect between a battery cell and a busbar may be easily checked.

At present, internal components of each of most banks are connected to each other in parallel. In case of 7P of FIG. 1, seven weld portions (black solid lines) are provided at the positive electrodes, and seven weld portions are provided at the negative electrodes, i.e., a total of 14 weld portions is provided. Total voltage normally appears even if there is a problem with one parallel connection. The most accurate method of detecting a welding defect between a battery cell and a busbar is to separately measure resistance between battery cells. With an increase in number of parallel connections in a bank and an increase in size of a battery module, it is almost impossible to perform the above-mentioned detection method in temporal and economic aspects.

At present, a method of detecting a welding defect in one bank, i.e. a battery module having internal components connected to each other in parallel, is to measure DC resistance. The bank is charged and discharged using a high current of 1 C or higher to measure resistance. It is possible to check a welding defect in the bank by measuring resistance due to a welding defect.

FIG. 2 is a schematic view of a conventional apparatus 100 for inspecting a welding defect in a battery module configured such that seven battery cells are connected to each other in parallel, i.e., one general bank. Reference numeral 110 indicates a high-capacity charger/discharger, and reference numeral 120 indicates voltage measurement equipment. The bank is charged and discharged with high current to measure resistance.

In each of the battery modules of FIGS. 1 and 2, seven battery cells are connected to each other in parallel. That is, each of the battery modules of FIGS. 1 and 2 is constituted by one bank as an example. As another example, a plurality of banks, in each of which battery cells are connected to each other in parallel, is connected to each other in series to constitute a battery module, which is shown in FIG. 3. In FIG. 3, the battery module is charged and discharged with high current to measure resistance of each bank, whereby a welding defect in each bank is checked. In each bank 232 of FIG. 3, which is identical to the battery module 130 shown in FIG. 2, a plurality of battery cells is connected to each other in parallel.

A conventional method requires 1) a large-capacity charger/discharger capable of performing charging and discharging with high current. In order to simultaneously inspect a plurality of battery modules, a large number of large-capacity chargers/dischargers is necessary. These occupy much space, and economical burden is also increased. 2) Since charging and discharging must be performed, time necessary for detection is increased. With recent increase in capacity of a battery cell or a battery module, detection time has been increased more and more.

The present invention, which has been made in view of the above problems, is an invention derived to rapidly detect a welding defect using low-capacity equipment.

There is electrochemical impedance spectroscopy (EIS) as a known method of measuring characteristics of a battery cell using AC power.

Electrochemical impedance spectroscopy is a method of applying alternating current having a specific frequency band to a battery cell and observing frequency response characteristics obtained as the result thereof. In this method, an observed impedance spectrum is simulated as an equivalent circuit model of a battery, from which a specific internal resistance component of the battery is analyzed.

FIG. 4 is a view showing an example of an equivalent model of a battery cell used in electrochemical impedance spectroscopy. The equivalent model may be simulated as an electrochemical cell E, a series inductor $L_0$, a series resistor $R_0$, and a plurality of capacitors $C_1$ to $C_n$ and a plurality of resistors $R_1$ to $R_n$ connected respectively to each other in parallel. An impedance spectrum according to electrochemical impedance spectroscopy is generally shown in a complex number form due to the phase difference of the inductor, and has a real part and an imaginary part. To date, electrochemical impedance spectroscopy has been used to evaluate the performance of a battery cell.

Patent Document 1 relates to a secondary battery state determination method, a secondary battery state determination apparatus, and a secondary battery regeneration method. Patent Document 1 discloses a method of applying alternating-current voltage to a secondary battery to detect the amount of electricity related to impedance of the secondary battery or the amount of electricity related to the maximum output density of the secondary battery and determining the performance of the secondary battery based on the amount of electricity. This method is a method of calculating the amount of electricity after or during charging and discharging for initial activation of the secondary battery and determining initial output activity of the secondary battery based on the amount of electricity. In Patent Document 1, which relates to a battery inspection method that does not require great discharging, alternating current is applied to the secondary battery and alternating-current resistance is measured to determine only a defect of the battery.

Patent Document 2 relates to a failure diagnosis apparatus for fuel cell stacks. The apparatus disclosed in Patent Document 2 includes an alternating current suction unit connected to a fuel cell stack for failure diagnosis of the fuel cell stack, the alternating current suction unit being switched depending on an alternating-current signal applied thereto such that current from the fuel cell stack flows in the alternating current suction unit, and an alternating-current signal generation unit configured to generate an alternating-current signal and to supply the generated alternating-current signal to the alternating current suction unit. As current from the fuel cell stack is suctioned into the alternating current suction unit according to the alternating-current signal, stack current input to a diagnosis processing unit includes an alternating-current component. Patent Document 2, which relates to technology for inspecting a battery stack in which a plurality of unit cells is disposed, discloses that an alternating-current signal is generated and alternating-current impedance is measured to diagnose whether the cell stack is abnormal.

Patent Document 3 relates to a secondary battery inspection method. Patent Document 3 discloses an inspection method including a measurement process of measuring impedance of each secondary battery in a secondary battery group and a process of determining whether the secondary battery is defective based on the acquired impedance.

Patent Document 4 relates to a storage battery degradation diagnosis method and a storage battery degradation diagnosis apparatus. Patent Document 4 discloses a method of measuring impedance of a storage battery based on a current value and a voltage value that appear when alternating current is supplied to the storage battery and diagnosing degradation of the storage battery based on the impedance value.

As described above, in the prior patent documents, each of which relates to technology for rapidly inspecting a battery without long-term charging and discharging, alternating current is supplied to the battery to measure impedance, and a short-term defect or a long-term defect of the battery is diagnosed based on the impedance value.

In conventional electrochemical impedance spectroscopy, characteristics of a battery in a low frequency band reflecting internal characteristics of the battery are mainly analyzed. Research to analyze a low frequency band related to chemical behavior in a battery cell, thereby predicting lifespan characteristics of a battery and long-term behavior of the battery, has mainly been conducted. The reason for this is that, in a high frequency band, there is little difference between batteries or battery cells, and therefore it is difficult to check characteristics of the battery.

PRIOR ART DOCUMENTS (Patent Document 1) Japanese Registered Patent Publication No. 3598873
(Patent Document 2) Korean Registered Patent Publication No. 1416399
(Patent Document 3) Japanese Patent Application Publication No. 2018-041581
(Patent Document 4) Japanese Patent Application Publication No. 2007-333494

DISCLOSURE

Technical Problem

The present invention has been made in view of the above problems, and it is an object of the present invention to provide a welding inspection apparatus for battery modules capable of detecting a welding defect in a battery module and a method of inspecting welding of the battery module using the same, and more particularly a welding inspection apparatus for battery modules having smaller charging and discharging capacities than a conventional welding inspection apparatus for battery modules and a method of rapidly inspecting welding of the battery module using the same.

Technical Solution

In order to accomplish the above object, the present invention provides a welding inspection apparatus for battery modules, the welding inspection apparatus including a bank constituted by two or more battery cells connected in parallel, a battery module constituted by one or more banks connected in series, an alternating current application unit configured to apply an alternating current to an entirety of the battery module, and a measurement unit configured to measure an impedance of each of the one or more banks.

Each of the battery cells may be any one of a cylindrical battery, a prismatic battery, or a pouch-shaped battery. Any battery cell capable of generating current through electrochemical action may be used. In addition, a secondary battery or a fuel cell may also be used.

The measurement unit may measure impedance of each of the banks, and may also measure impedance of the entirety of the battery module. In addition, the measurement unit may measure voltage or current of the entirety of the battery module, or may measure voltage or current of each of the banks.

In the bank constituted by two or more battery cells connected to each other in parallel, five or more battery cells may be generally connected to each other in parallel; however, the number of battery cells is not limited to a specific value. In addition, the banks may be connected to each other in series. In general, three or more banks may be connected to each other in series; however, the number of banks is not limited to a specific value.

A controller configured to control the alternating current application unit and the measurement unit may be added. The controller may be separately added, or a BMS configured to control the battery module or a battery pack may simultaneously perform the function of the controller. When the welding inspection apparatus for battery modules is a separate welding inspection apparatus for battery modules configured to check whether a battery module is abnormal, the controller may be constituted as a separate device.

The welding inspection apparatus according to the present invention may further include a current transformer (CT) connected to a positive electrode terminal of the battery module. Alternating current added to the entirety of the battery module through the current transformer may be measured, alternating-current voltage applied to each of the banks may also be separately measured, and impedance of each of the banks may be measured based thereon.

When the resistance value of each of the one or more banks calculated by the controller is greater than a predetermined resistance value, a determination may be made that a welding of at least one of the two or more battery cells in the bank is defective. When the resistance value of each of the banks is greater than a predetermined resistance value, this may mean that the resistance value of each of the one or more banks is greater than the resistance value of a normal bank measured in advance or that the resistance value of each of the one or more banks is greater than the resistance value of another bank. The welding inspection apparatus according to the present invention measures different resistance values when one welding defect spot is present in a relevant bank and when two welding defect spots are present in a relevant bank, whereby it is possible to quantitatively check welding defects occurring in the relevant bank.

In the apparatus according to the present invention, the alternating current may have a frequency of 10 kHz or higher, preferably 100 kHz or higher. The alternating current may have a maximum current of 1 $A_{peak}$. The current may be changed depending on the battery module to be inspected. For a general battery module, however, sufficient inspection may be possible at 1 $A_{peak}$.

The resistance value may be a resistance value corresponding to a real part of the impedance. Although impedance has a value of a real part and a value of an imaginary part, the resistance value to be measured in the present invention may correspond to the real part.

In addition, the present invention provides a method of inspecting welding of a battery module using the welding inspection apparatus, the method including:

applying an alternating current to an entirety of the battery module;

measuring the alternating current that flows in the entirety of the battery module and a voltage of each bank of the one or more banks;

calculating the impedance and the resistance value of the each bank; and when the resistance value of the each bank is greater than a predetermined resistance value, determining that the welding of at least one battery cell in the each bank is defective.

In the method according to the present invention, the alternating current may have a frequency of 10 kHz or higher, preferably 100 kHz or higher. The alternating current may have a maximum current of 1 $A_{peak}$. The current may be changed depending on the battery module to be inspected. For a general battery module, however, sufficient inspection may be possible at 1 $A_{peak}$.

In the method according to the present invention, the resistance value may be a resistance value corresponding to a real part of the impedance. Although impedance has a value of a real part and a value of an imaginary part, the resistance value to be measured in the present invention may correspond to the real part.

In the method according to the present invention, when the resistance value of the each back calculated by the controller is greater than a predetermined resistance value, a determination may be made that the welding of the battery cells in the each bank is defective. When the resistance value of the each bank is greater than a predetermined resistance value, this may mean that the resistance value of the each bank is greater than the resistance value of a normal bank measured in advance or that the resistance value of the each bank is greater than the resistance value of another bank. The welding inspection apparatus according to the present invention measures different resistance values when one welding defect spot is present in a relevant bank and when two welding defect spots are present in a relevant bank, whereby it is possible to quantitatively check welding defects occurring in the relevant bank.

In addition, the present invention may provide various combinations of the above solving means.

Advantageous Effects

In an apparatus and method for detecting a welding defect in a battery module according to the present invention, 1) a large-capacity charger/discharger capable of performing charging and discharging with high current is not necessary, unlike the conventional art. Conventionally, a large charger/discharger capable of performing charging and discharging with a high current of 1 C or higher is necessary. In the present invention, however, it is possible to detect an internal welding defect using an alternating current supply device having a capacity much less than the capacity of the conventional charger/discharger. 2) Also, in the present invention, only a high frequency band having a very short time, among alternating current frequencies, is used. Since measurement time thereof is much shorter than conventional charging and discharging time, it is possible to remarkably reduce detection time. 3) The apparatus and method according to the present invention are also capable of individually checking the number of welding defects occurring in a relevant bank, and therefore utilization as Q/C for a welding process is possible.

DESCRIPTION OF DRAWINGS

FIG. 1 is a schematic view of a bank constituted by cylindrical batteries connected to each other in parallel using busbars.

FIG. 2 is a schematic view of a conventional apparatus for inspecting welding of a battery module configured such that seven battery cells are connected to each other in parallel.

FIG. 3 is a schematic view of a conventional apparatus for inspecting welding of a battery module configured such that six banks, in each of which battery cells are connected to each other in parallel, are connected to each other in series.

FIG. 4 is a view showing an example of an equivalent model of a battery cell used in electrochemical impedance spectroscopy.

FIG. 5 is a schematic view of an apparatus for inspecting welding of a battery module configured such that six banks, in each of which battery cells are connected to each other in parallel, are connected to each other in series, as an embodiment of the present invention.

FIG. 6 is a flowchart showing a method of inspecting welding of a battery module using the welding inspection apparatus for battery modules according to the present invention.

FIG. 7 is a photograph of a battery module (bank) used in an embodiment of the present invention.

FIG. 8 is a view showing an impedance spectrum of each of normal battery modules using the apparatus according to the present invention.

FIG. 9 is a view showing an impedance spectrum of each of abnormal battery modules using the apparatus according to the present invention.

FIG. 10 is a view showing the difference in impedance spectrum between abnormal battery modules using the apparatus according to the present invention.

FIG. 11 is a view showing the difference in impedance spectrum between battery modules including abnormal battery cells using the apparatus according to the present invention.

FIG. 12 is a view showing the difference in impedance spectrum between poorly welded battery modules including abnormal battery cells using the apparatus according to the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

FIG. 5 is a schematic view of an apparatus 300 for inspecting welding of a battery module configured such that six banks, in each of which battery cells are connected to each other in parallel, are connected to each other in series, as an embodiment of the present invention.

The welding inspection apparatus 300 according to the present invention includes a bank 332 constituted by two or more battery cells connected to each other in parallel, a battery module 330 constituted by one or more banks 332 connected to each other in series, an alternating current application unit 310 configured to apply alternating current to the entirety of the battery module 330, and a measurement unit 320 configured to measure impedance of each of the banks 332.

Although the interior of the bank 332 is not shown in detail in FIG. 5, at least two battery cells must be connected to each other in parallel in order to achieve parallel connection. In the bank, five or more battery cells are generally connected to each other in parallel; however, the number of battery cells is not limited to a specific value. Although six banks are shown as being connected to each other in series in FIG. 5, which, however, is merely an example, and only one bank may be provided. When one bank is provided, the bank may have the same structure as the battery module 130 shown in FIG. 2. Even in this case, however, a welding defect may be inspected. The banks are connected to each other in series. In general, three or more banks are connected to each other in series; however, the number of banks is not limited to a specific value.

The measurement unit 320 may measure impedance of each of the banks 332, and may also measure impedance of the entirety of the battery module 330. In addition, the measurement unit 320 may measure voltage or current of the entirety of the battery module 330, may measure voltage or current of each of the banks 332, or may measure voltage or current of each of the battery cells (not shown) in each of the banks 332.

A controller 340 configured to control the alternating current application unit 310 and the measurement unit 320 may be added. Although the controller 340 is shown as being connected to only the measurement unit 320 in FIG. 5, the controller 340 may also directly control the alternating current application unit 310. The controller 340 may be separately added, or a BMS configured to control the battery module 330 or a battery pack (not shown) may simultaneously perform the function of the controller. The welding inspection apparatus for battery modules of FIG. 5 is a separate welding inspection apparatus for battery modules configured to check whether a battery module is abnormal. In this case, therefore, the alternating current application unit 310, the measurement unit 320, and the controller 340 are constituted as separate devices.

A current transformer (CT) 350 is connected to a positive electrode (+ pole) terminal of the battery module 330.

Alternating current added to the entirety of the battery module through the current transformer 350 is measured. The current transformer is generally used to measure high-voltage alternating current. Alternating current that flows in the entirety of the battery module is shown as being measured using the current transformer in FIG. 5. Since alternating current according to the present invention does not have a relatively high voltage, however, it is possible to measure current using another ordinary device. Meanwhile, alternating-current voltage applied to each of the banks 332 may also be separately measured, and impedance of each of the banks may be measured based thereon.

FIG. 5 shows an example for impedance measurement, wherein a change to a construction capable of separately measuring impedance of the battery module and each bank in the battery module is possible.

When the resistance value of each of the banks 332 is greater than a predetermined resistance value, a determination may be made that welding of the battery cells in the bank is defective. When the resistance value of each of the banks 332 is greater than a predetermined resistance value, this may mean that the resistance value of each of the banks 332 is greater than the resistance value of a normal bank measured in advance or that the resistance value of each of the banks 332 is greater than the resistance value of another bank. The welding inspection apparatus 300 according to the present invention measures different resistance values when one welding defect spot is present in a relevant bank 332 and when two welding defect spots are present in a relevant bank 332, whereby it is possible to quantitatively check welding defects occurring in the relevant bank 332.

In the apparatus 300 according to the present invention, the alternating current may have a frequency of 10 kHz or higher, preferably 100 kHz or higher. The alternating current may have a maximum current of 1 $A_{peak}$ The current may be changed depending on the battery module 330 to be inspected. For a general battery module, however, sufficient inspection is possible at 1 $A_{peak}$.

The resistance value may be a resistance value corresponding to a real part of impedance. Although impedance value has a real part and an imaginary part, the resistance value to be measured in the present invention corresponds to the real part.

FIG. 6 is a flowchart showing a method of inspecting welding of a battery module using the welding inspection apparatus for battery modules according to the present invention. As shown in FIG. 6, the method includes 1) a step of applying alternating current to the entirety of a battery module, 2) a step of measuring alternating current that flows in the entirety of the battery module and voltage of each bank, 3) a step of calculating impedance and the resistance value of each bank, and 4) a step of determining whether welding of a battery cell is defective. In step 4), specifically, when the resistance value of each bank is greater than a predetermined resistance value, a determination is made that welding of a battery cell in the bank is defective.

Hereinafter, specific embodiments of the present invention will be described.
(Battery Module)

In order to measure a welding defect of a battery module according to the present invention, specifically one bank, experiments were performed using one bank (1S7P) constituted by seven cylindrical batteries connected to each other in parallel. The shape of the bank used in the embodiment is identical to that in FIG. 1. In FIG. 1, a black-line circle having a negative electrode or a positive electrode marked therein is a measurement point of a busbar at which impedance of the entirety of the bank is measured. The measurement point is merely an example, and any portion of a negative electrode busbar or a positive electrode busbar may be used as the measurement point.

FIG. 7 is a photograph of a battery module (bank) used in an embodiment of the present invention. FIG. 7 shows a product having a busbar connection region broken (indicated by a white circle) to intentionally generate a welding defect. The right upper end and the left lower end of FIG. 7 indicate busbar connection portions configured to connect a power source to a relevant bank, and impedance of the relevant bank was measured through the connection portions.
(Measurement of Impedance)

In the present invention, IM3590 of HIOKI Company was used to measure impedance. A battery module for impedance measurement was constituted by cylindrical battery cells so as to have a structure of 1S7P. Impedance was measured at a measurement current of 0.5 $A_{peak}$ while a frequency was changed from 0.01 Hz to 100 kHz. In addition, impedance of an abnormal battery module was measured under the same conditions.
(Impedance Spectrum of Normal Battery Module)

An impedance spectrum of each of four 1S7P battery modules upon which normal welding has been performed was measured. FIG. 8 shows an impedance spectrum of each of normal battery modules using the apparatus according to the present invention. In all of the following impedance spectra, the x-axis indicates frequency, and the y-axis indicates a resistance value of a real part of impedance. Measurement was performed using a frequency of 0.01 Hz to 100 kHz. FIG. 8 shows the measurement result of impedance of each of four battery modules designated as Sample 1 to Sample 4. It can be seen that, in a frequency band of 10 kHz or higher, AC resistance Rs was sharply increased with an increase in frequency. It can be seen that frequency characteristics of the four normal samples almost coincide with each other. Particularly, it can be seen that, for high frequency, the results overlapped each other, whereby there was little difference.
(Impedance Spectrum of Abnormal Battery Module)

An impedance spectrum of each of four battery modules upon which welding has been abnormally performed was measured. Measurement was performed using the same measurement method as in FIG. 8. FIG. 9 shows an impedance spectrum of each of abnormal battery modules using the apparatus according to the present invention. Equally to FIG. 8, it can be seen that, in a frequency band of 10 kHz or higher, AC resistance was sharply increased with an increase in frequency.

Particularly, in FIG. 9, 7P indicates a normal battery module, i.e. the case in which all of seven battery cells were normally connected to each other in parallel, 6P indicates the case in which parallel connection of one of the seven battery cells was released, 5P indicates the case in which parallel connection of two of the seven battery cells was released, and 4P indicates the case in which parallel connection of three of the seven battery cells was released. It can be seen from FIG. 9 that resistance was increased at clear intervals depending on the number of connection defects, i.e. the number of welding defects. In the present invention, therefore, it is possible to discriminate quantitative defects of internal welding, i.e. the number of welding defects, as well as the result of ON/OFF related to welding defects in the battery module.

FIG. 10, which analyzes FIG. 9, i.e. the result of the impedance spectrum of each of the abnormal battery modules using the apparatus according to the present invention, shows the difference between the normal and abnormal battery modules. ΔRs (7P-6P), ΔRs (6P-5P), and ΔRs (5P-4P) indicate the difference in impedance spectrum between the normal battery module (7P) and the battery module (6P), in which parallel connection of one battery cell was released, the difference in impedance spectrum between the battery module (6P), in which parallel connection of one battery cell was released, and the battery module (5P), in which parallel connection of two battery cells was released, and the difference in impedance spectrum between the battery module (5P), in which parallel connection of two battery cells was released, and the battery module (4P), in which parallel connection of three battery cells was released, respectively. It can be seen that, in a high frequency region, the distance therebetween was gradually increased, and therefore it can be seen that it is possible to more clearly check whether internal welding is abnormal and the number of abnormal welds based on the difference between the spectrum of a normal case and spectrum of an abnormal case.

(Impedance Spectrum of Battery Module Including Abnormal Battery Cell)

The result of impedance measurement according to the present invention is a result that may be obtained due to overlapping between various physical and chemical phenomena. An abnormal impedance spectrum may be observed due to a battery defect as well as a welding defect. In the present invention, experiments were performed in order to determine whether it is possible to maintain discrimination capable of checking a welding defect by an impedance spectrum even in this case.

An impedance spectrum of each of four 1S7P battery modules upon which welding has been normally performed, designated as Battery module 1 to Battery module 4, respectively, was measured. In Battery module 3, however, a battery cell was abnormal. In FIG. 11, ΔRs12, ΔRs13, ΔRs14, ΔRs23, ΔRs24, and ΔRs34, which are difference values in impedance spectrum between the battery modules, are a difference value in impedance spectrum between Battery module 1 and Battery module 2, a difference value in impedance spectrum between Battery module 1 and Battery module 3, a difference value in impedance spectrum between Battery module 1 and Battery module 4, a difference value in impedance spectrum between Battery module 2 and Battery module 3, a difference value in impedance spectrum between Battery module 2 and Battery module 4, and a difference value in impedance spectrum between Battery module 3 and Battery module 4, respectively.

Since Battery module 3 has an abnormal battery cell, ΔRs13, ΔRs23, and ΔRs34 show abnormally increased peaks at about 15 kHz to 20 kHz. That is, it can be seen that the impedance spectrum of a battery module also includes the result of whether a battery cell is abnormal.

One weld portion of each of all of the battery modules upon which welding has been normally performed, i.e., Battery module 1 to Battery module 4, was broken intentionally such that the structure of each battery module was changed from 1S7P to 1S6P. An impedance spectrum of each of the changed battery modules was measured, and the difference in impedance spectrum between each of the changed battery modules and Battery module 1, in which battery cells were normal and welding was also normal, is shown in FIG. 12.

In FIG. 12, what is faintly marked is the result of FIG. 11. In FIG. 12, Rs1, Rs2, Rs3, and Rs4 indicate the differences between impedance spectra of Battery module 1 to Battery module 4 changed to 1S6P and impedance spectrum of Battery module 1, i.e. the normal 1S7P battery module, respectively.

It can be seen from the result of FIG. 12 that Battery module 3 has a result similar to the result of each of Battery module 1, Battery module 2, and Battery module 4 in a frequency band of 10 kHz or higher even though the battery cell is abnormal. In particular, when compared with the result of FIG. 11 faintly marked in FIG. 12, it can be seen that whether welding is abnormal can be clearly discriminated in a frequency band of 10 kHz or higher despite an influence due to abnormality of the battery cell.

Those skilled in the art to which the present invention pertains will appreciate that various applications and modifications are possible within the category of the present invention based on the above description.

DESCRIPTION OF REFERENCE NUMERALS

100, 200: Conventional welding inspection apparatuses
110, 210: Chargers/dischargers
112, 212, 312: Current application lines
120, 220: Voltage measurement equipment
122, 222, 322: Measurement line
130, 230, 330: Battery modules
132: Battery cell
232, 332: Banks
300: Welding inspection apparatus according to embodiment of present invention
310: Alternating current application unit
320: Measurement unit
340: Controller
350: Current transformer

The invention claimed is:

1. A welding inspection apparatus for battery modules, the welding inspection apparatus comprising:
   a bank constituted by two or more battery cells connected in parallel;
   a battery module constituted by one or more banks connected in series;
   an alternating current application unit configured to apply an alternating current to an entirety of the battery module; and
   a measurement unit configured to measure an impedance of each of the one or more banks,
   wherein, when a resistance value of each of the one or more banks is greater than a predetermined resistance value, a determination is made that a welding of at least one of the two or more battery cells in the bank is defective, and a quantity of defects in each of the one or more banks is determined based on resistance values with respect to a frequency of the alternating current of the one or more banks that is greater than a predetermined frequency, and
   wherein the resistance value increases as a number of welding defects present in a relevant bank increases, such that welding defects occurring in the relevant bank is quantitatively identified.

2. The welding inspection apparatus according to claim 1, further comprising a controller configured to control the alternating current application unit and the measurement unit.

3. The welding inspection apparatus according to claim 1, further comprising a current transformer (CT) connected to a positive electrode terminal of the battery module.

4. The welding inspection apparatus according to claim 1, wherein the alternating current has the predetermined frequency of 10 kHz or higher.

5. The welding inspection apparatus according to claim 1, wherein the resistance value is a resistance value corresponding to a real part of the impedance.

6. A method of inspecting a welding of the battery module using the welding inspection apparatus according to claim 1, the method comprising:

applying the alternating current to the entirety of the battery module;

measuring the alternating current that flows in the entirety of the battery module and a voltage of each bank of the one or more banks;

calculating the impedance and a resistance value of the each bank; and when the resistance value of the each bank is greater than the predetermined resistance value, determining that the welding of at least one battery cell in the each bank is defective.

7. The method according to claim 6, wherein the alternating current has the predetermined frequency of 10 kHz or higher.

8. The method according to claim 6, wherein the alternating current has a maximum current of 1 $A_{peak}$.

9. The method according to claim 6, wherein the resistance value is a resistance value corresponding to a real part of the impedance.

10. The method according to claim 6, wherein, when the resistance value of the each bank is greater than the predetermined resistance value, it is determined that the resistance value of the each bank is greater than a resistance value of a normal bank measured in advance or that the resistance value of the each bank is greater than a resistance value of another bank.

11. The welding inspection apparatus according to claim 1, wherein a number of abnormal welds of the two or more battery cells is determined based on an impedance spectrum of the battery module.

12. The welding inspection apparatus according to claim 1, wherein the welding of the at least one of the two or more battery cells in the bank is defective is determined based on an impedance spectrum of the battery module using the frequency of the alternating current peaking at about 15 kHz to 20 kHz.

13. The welding inspection apparatus according to claim 1, wherein the alternating current has the predetermined frequency of about 100 kHz or higher.

\* \* \* \* \*